US011473528B2

(12) United States Patent
Vilhes et al.

(10) Patent No.: US 11,473,528 B2
(45) Date of Patent: Oct. 18, 2022

(54) AIRCRAFT TURBOFAN HAVING A COWL ARTICULATED IN ROTATION AND A SYSTEM FOR DEPLOYING SAID COWL

(71) Applicant: Airbus Operations SAS, Toulouse (FR)

(72) Inventors: Corentin Vilhes, Toulouse (FR); Simon Vanderbauwede, Toulouse (FR); Thierry Gaches, Toulouse (FR); Laurent Cazeaux, Toulouse (FR); Pascal Gardes, Toulouse (FR); Guillaume Seguin, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 17/488,725

(22) Filed: Sep. 29, 2021

(65) Prior Publication Data

US 2022/0106927 A1 Apr. 7, 2022

(30) Foreign Application Priority Data

Oct. 2, 2020 (FR) ........................................ 2010094

(51) Int. Cl.
*B64D 29/00* (2006.01)
*F02K 7/08* (2006.01)
*F04D 29/52* (2006.01)

(52) U.S. Cl.
CPC .............. *F02K 7/08* (2013.01); *F04D 29/522* (2013.01); *B64D 29/00* (2013.01); *F05D 2220/36* (2013.01)

(58) Field of Classification Search
CPC ....... F02K 7/08; F04D 29/522; F05D 2220/36
See application file for complete search history.

(56) References Cited

U.S. PATENT DOCUMENTS 4,399,966 A * 8/1983 Crudden ................ B64D 29/08 244/129.4
4,440,068 A * 4/1984 Tootle ................. F15B 15/1476 92/52
5,609,313 A * 3/1997 Cole ...................... B64D 29/00 244/54

(Continued)

FOREIGN PATENT DOCUMENTS

WO 2017098122 A1 6/2017

OTHER PUBLICATIONS

French Search Report; priority document.

*Primary Examiner* — Lorne E Meade
(74) *Attorney, Agent, or Firm* — Greer, Burns & Crain, Ltd.

(57) ABSTRACT

A turbofan having a fixed structure, a fan, a fan casing surrounding the fan, an outer cowl disposed around the fan casing and mounted so as to be articulated on the fixed structure, and a deployment system that moves the outer cowl from a closed position to an open position. The deployment system has a guide rail fastened around the fan casing, a slider that is able to move along the guide rail and has a shoe. An activation system of the deployment system moves the slider and the shoe alternately in one direction or the other along the guide rail. One end of an arm of the deployment system is mounted to be articulated on the shoe and another end is mounted to be articulated on the outer cowl. Such a motorized deployment system makes it possible to save space and mass in the turbofan.

8 Claims, 5 Drawing Sheets

(56) References Cited

U.S. PATENT DOCUMENTS

| | | | | |
|---|---|---|---|---|
| 6,227,485 | B1 * | 5/2001 | Porte | B64D 29/08 244/54 |
| 6,340,135 | B1 * | 1/2002 | Barton | B64D 29/00 244/54 |
| 8,091,832 | B2 * | 1/2012 | Marche | B64D 29/08 244/129.5 |
| 8,333,344 | B2 * | 12/2012 | Vauchel | B64D 29/06 244/1 N |
| 8,740,137 | B2 * | 6/2014 | Vauchel | F02C 7/04 244/54 |
| 9,211,956 | B2 * | 12/2015 | Joret | B64D 29/08 |
| 9,783,314 | B2 * | 10/2017 | Pautis | F02K 1/085 |
| 10,081,434 | B2 * | 9/2018 | Lozano | B64D 29/06 |
| 2016/0031563 | A1 | 2/2016 | Pautis | |
| 2018/0283216 | A1 | 10/2018 | Ancuta et al. | |

* cited by examiner

AIRCRAFT TURBOFAN HAVING A COWL ARTICULATED IN ROTATION AND A SYSTEM FOR DEPLOYING SAID COWL

CROSS-REFERENCES TO RELATED APPLICATIONS

This application claims the benefit of the French patent application No. 2010094 filed on Oct. 2, 2020, the entire disclosures of which are incorporated herein by way of reference.

BACKGROUND OF THE INVENTION

The present invention relates to an aircraft turbofan that has a cowl articulated in rotation and a system for deploying the cowl, and to an aircraft having at least one such turbofan.

BACKGROUND OF THE INVENTION

An aircraft conventionally has at least one turbofan that has an engine forming a core around which is arranged a nacelle that has a fixed structure that has a fan casing that surrounds a fan disposed in front of the engine and a front cowl that is around the fan casing and forms an outer aerodynamic surface.

The nacelle also has a rear cowl that extends the front cowl towards the rear and generally bears a thrust reversal system.

In order to allow maintenance to be performed on the turbofan, it is necessary to open the rear cowl in order to access the inside of the nacelle. To do this, the rear cowl is mounted so as to be articulated on the fixed structure and actuators are installed between the rear cowl and the fixed structure so as to assist with opening the rear cowl.

Although such a system is entirely satisfactory, it is necessary to find a system that is more compact and less bulky, and of which the mass has a limited impact on the engine performance.

SUMMARY OF THE INVENTION

One object of the present invention is to propose an aircraft propulsion system that has a cowl articulated on a fixed structure and can be rotated by a motorized deployment system.

To this end, a turbofan for an aircraft is proposed, the turbofan having a longitudinal axis and having a fixed structure, a fan, a cylindrical fan casing surrounding the fan, at least one outer cowl disposed around the fan casing and mounted so as to be articulated on the fixed structure, and, for each outer cowl, a deployment system that moves the outer cowl from a closed position to an open position and vice versa, wherein each deployment system has:

- a guide rail fastened along a part of the circumference of the fan casing,
- a slider that is able to move along the guide rail and has a shoe,
- an activation system that moves the slider and the shoe alternately in one direction or the other along the guide rail, and
- an arm of which one end is mounted so as to be articulated on the shoe and of which the other end is mounted so as to be articulated on the outer cowl, wherein the activation system has, for each slider, a motor that is fixed relative to the guide rail and of which the drive shaft is equipped with a gear and a rack that is realized on the slider and meshes with the gear.

Such a motorized deployment system makes it possible to save space and mass in the turbofan.

Advantageously, the guide rail is curved about the longitudinal axis.

Advantageously, the section of the guide rail takes the form of a U that is open towards the outside, of which the bottom is fastened to the fan casing, and the slider moves between the U-walls of the guide rail.

Advantageously, rollers having a groove on their circumference are distributed along each wall of the U constituting the guide rail and are mounted so as to be free to rotate about axes parallel to the longitudinal axis, and the slider has ribs with a shape that is the inverse of that of the grooves of the rollers.

Advantageously, the turbofan has two outer cowls, the two guide rails are extensions of one another in the bottom part of the turbofan, each slider takes the form of an arc inscribed in a plane perpendicular to the longitudinal axis and the two planes are at a distance from one another.

Advantageously, each outer cowl has a fixed cowl that is mounted in an articulated manner and a mobile cowl that is behind the fixed cowl and is mounted so as to be able to move in translation on the fixed cowl between an advanced position and a retracted position.

Advantageously, the turbofan has cascades secured to the mobile cowl and, in the advanced position, the cascades are housed between the fan casing and the fixed cowl and the guide rail is between the fan casing and the cascades.

The invention also proposes an aircraft having at least one turbofan according to one of the preceding variants.

BRIEF DESCRIPTION OF THE DRAWINGS

The abovementioned features of the invention, along with others, will become more clearly apparent upon reading the following description of an exemplary embodiment, the description being given with reference to the appended drawings, in which.

DETAILED DESCRIPTION OF THE PREFERRED EMBODIMENTS

In the following description, terms relating to a position are considered with reference to the direction of forward movement of an aircraft, indicated by the arrow F in FIG. 1.

Figure 1:
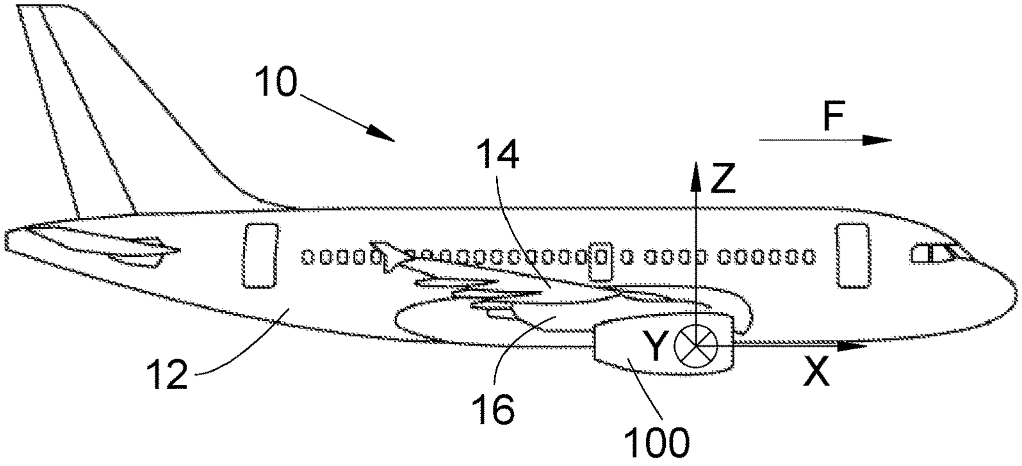
FIG. 1 is a side view of an aircraft according to the invention.

FIG. 1 shows an aircraft 10 that has a fuselage 12, to each side of which is fastened a wing 14 that bears at least one pylon 16, beneath which a turbofan 100 is fastened.

In the following description, and by convention, X denotes the longitudinal axis of the turbofan 100 which is parallel to the longitudinal axis of the aircraft 10 and is oriented positively toward the front of the aircraft 10, Y denotes the transverse axis which is horizontal when the aircraft 10 is on the ground, and Z denotes the vertical axis when the aircraft 10 is on the ground, these three axes X, Y and Z being mutually orthogonal.

Figure 2:
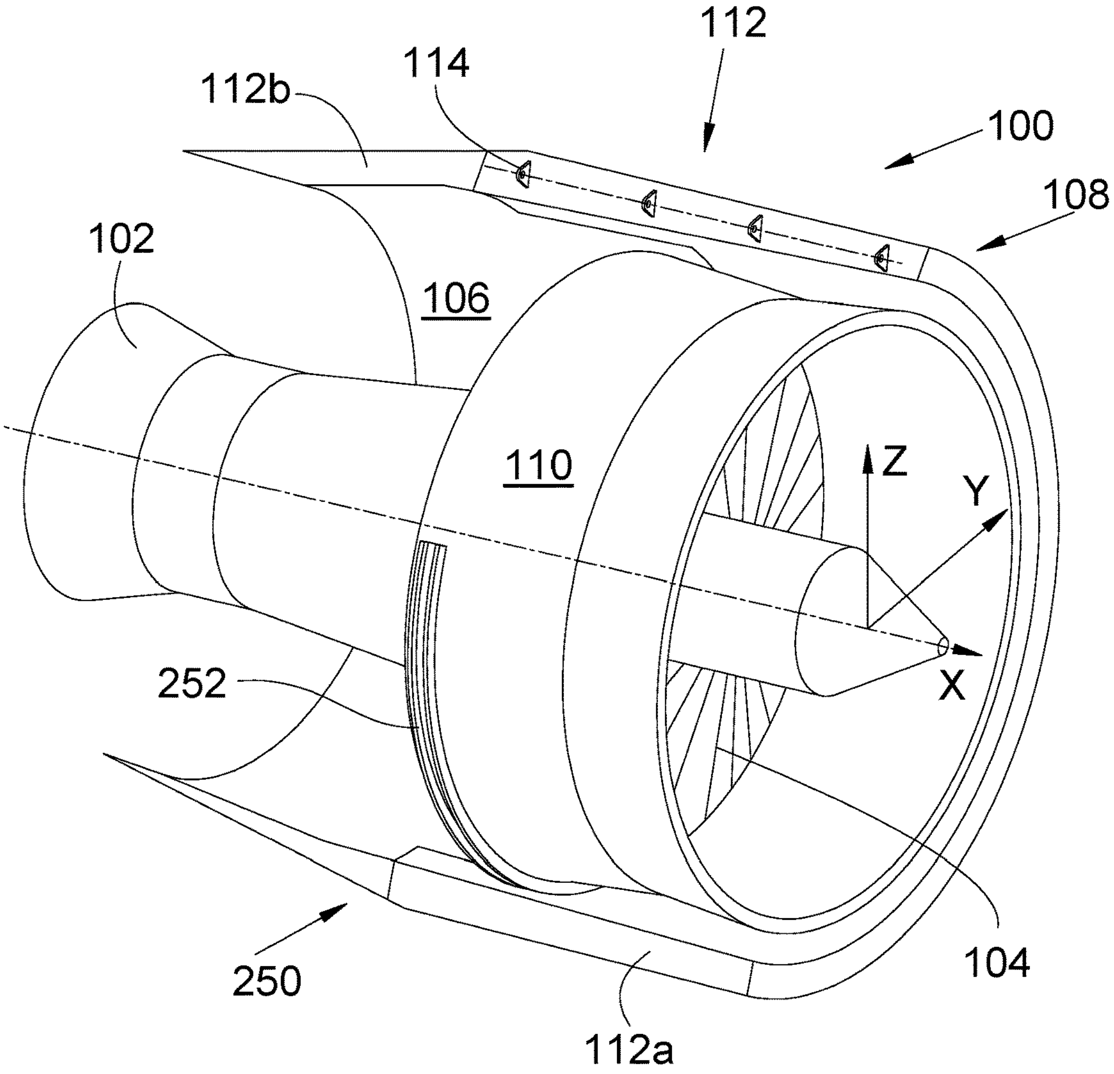
FIG. 2 is a schematic perspective view of a turbofan according to the invention.

FIG. 2 shows an example of a turbofan 100 according to the invention.

The turbofan 100 has an engine 102 at the front of which is mounted a fan 104 intended to generate a flow of air in the turbofan 100 from the front towards the rear and where, as is known, the flow of air then moves downstream from the fan 104 partially in a primary duct of the turbofan 100 and partially in a secondary duct 106 of the turbofan 100.

The engine 102 forms a core through which the air of the primary duct circulates.

The turbofan 100 also has a nacelle 108 that surrounds the engine 102 and the fan 104.

The engine 102 has a cylindrical fan casing 110 around the fan 104, and the nacelle 108 has at least one outer cowl 112 disposed around the fan casing 110. The fan casing 110 partially forms a fixed structure of the engine 102. Conventionally, there are two outer cowls 112.

In FIG. 2, only the port-side outer cowl has been shown.

Each outer cowl 112 is mounted so as to be articulated to a fixed structure of the turbofan 100 via hinges 114. The fixed structure of the turbofan 100 can, for example, be the pylon 16.

The axis of articulation of the outer cowl 112 is, in this case, the axis of the hinges 114 and is generally parallel to the longitudinal axis X.

Figure 4:
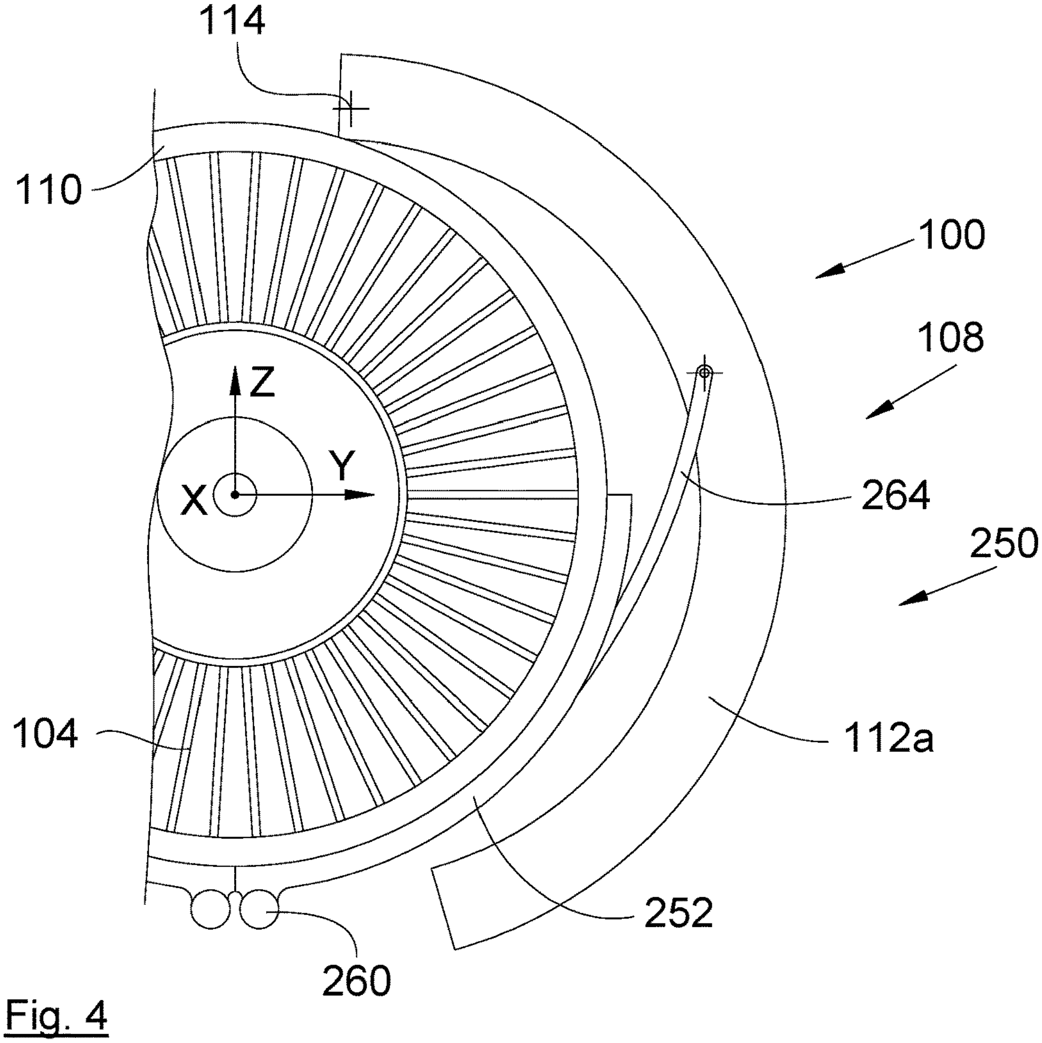
FIG. 4 is a front view of the turbofan according to the invention in the partially open position.
Figure 5:
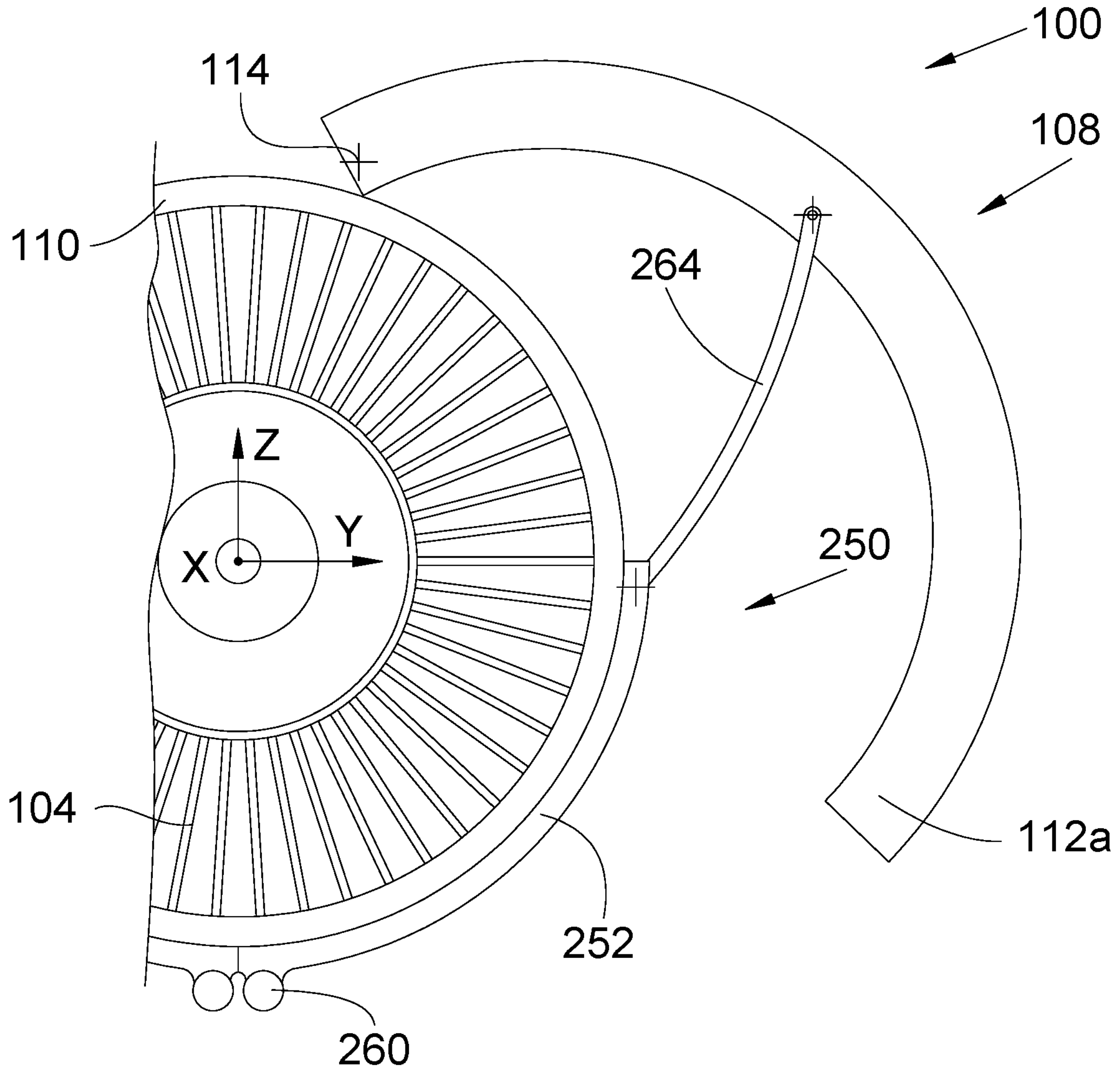
FIG. 5 is a front view of the turbofan according to the invention in the fully open position.

FIG. 2 shows the turbofan 100 in a position in which the outer cowls 112 are closed, and FIG. 5 shows the turbofan 100 in a position in which the outer cowls 112 are fully open. FIG. 4 shows the turbofan 100 in a position in which the outer cowls 112 are partially open.

Each outer cowl 112 is thus able to move in rotation on the fixed structure between the closed position and the open position and vice versa. In the closed position, the outer cowl 112 is close to the fan casing 110, and in the open position, the outer cowl 112 is distanced from the fan casing 110.

Figure 3:
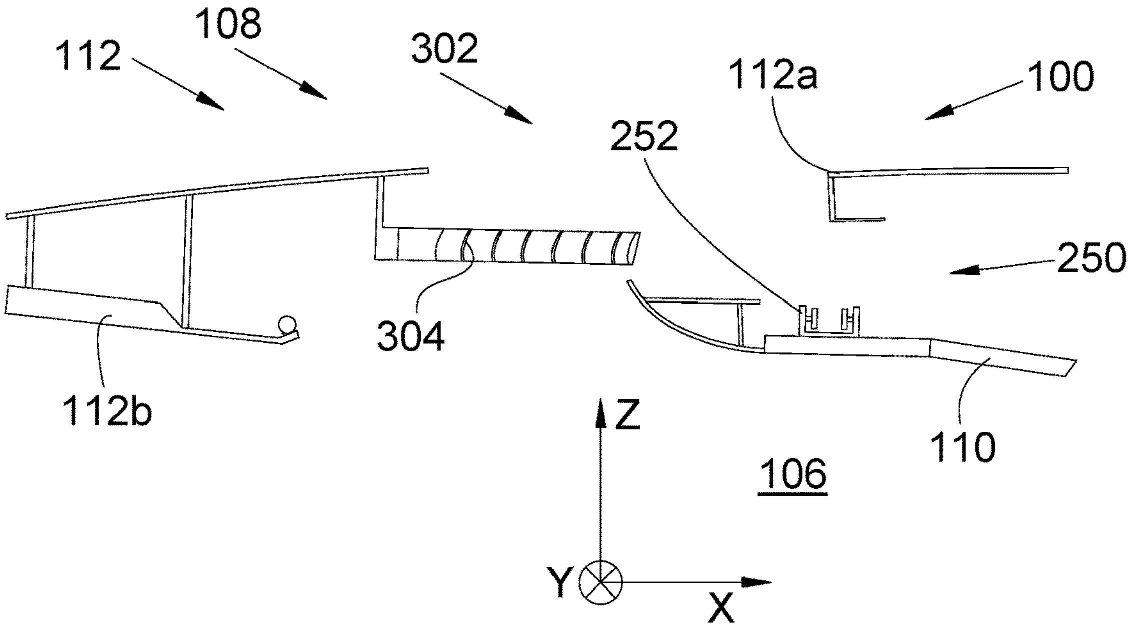
FIG. 3 is a view in section through an axial plane of the turbofan in FIG. 2.

In the embodiment in FIG. 2 and FIG. 3, each outer cowl 112 has a fixed cowl 112*a* and a mobile cowl 112*b* that is behind the fixed cowl 112*a* and is mounted so as to be able to move in translation on the fixed cowl 112*a*.

The articulation between the outer cowl 112 and the fixed structure is realized between the fixed structure and the fixed cowl 112*a* where the hinges 114 are mounted.

The mobile cowl 112*b* is guided on the fixed cowl 112*a* by any appropriate guide means, such as, for example, slides, and the mobile cowl 112*b* is moved by any appropriate drive means, such as, for example, actuators or motors.

The mobile cowl 112*b* is able to move in translation parallel to the longitudinal axis X between an advanced position (FIG. 2) and a retracted position (FIG. 3).

In the advanced position, the mobile cowl 112*b* adjoins the rear of the fixed cowl 112*a* and of the fan casing 110, in order to realize an aerodynamic continuity on the outside with the fixed cowl 112*a* and so as to externally delimit the secondary duct 106 with the fan casing 110.

In the retracted position, the mobile cowl 112*b* is lifted off and retracted with respect to the fixed cowl 112*a* and to the fan casing 110, in order to open a window 302 between the secondary duct 106 and the outside so as to allow the evacuation of the air of the secondary duct 106 towards the outside. The retracted position corresponds to a thrust reversal position of the turbofan 100.

The turbofan 100 has reversal means that are not shown, such as, for example, reversal doors that obstruct the secondary duct 106 behind the window 302 in order to guide the flow of air of the secondary duct 106 towards the outside through the window 302. The reversal doors can take any of the forms known to a person skilled in the art and they are deployed across the secondary duct 106 when the mobile cowl 112*b* retracts towards the retracted position and are stowed outside the secondary duct 106 when the mobile cowl 112*b* advances towards the advanced position.

In order to better guide the flow of air through the window 302, the nacelle 108 also has cascades 304 that are secured to the mobile cowl 112*b*, and move at the same time as the mobile cowl 112*b*, so as to be placed across the window 302 in the retracted position.

In the advanced position, the cascades 304 are housed between the fan casing 110 and the fixed cowl 112*a*.

Figure 6:
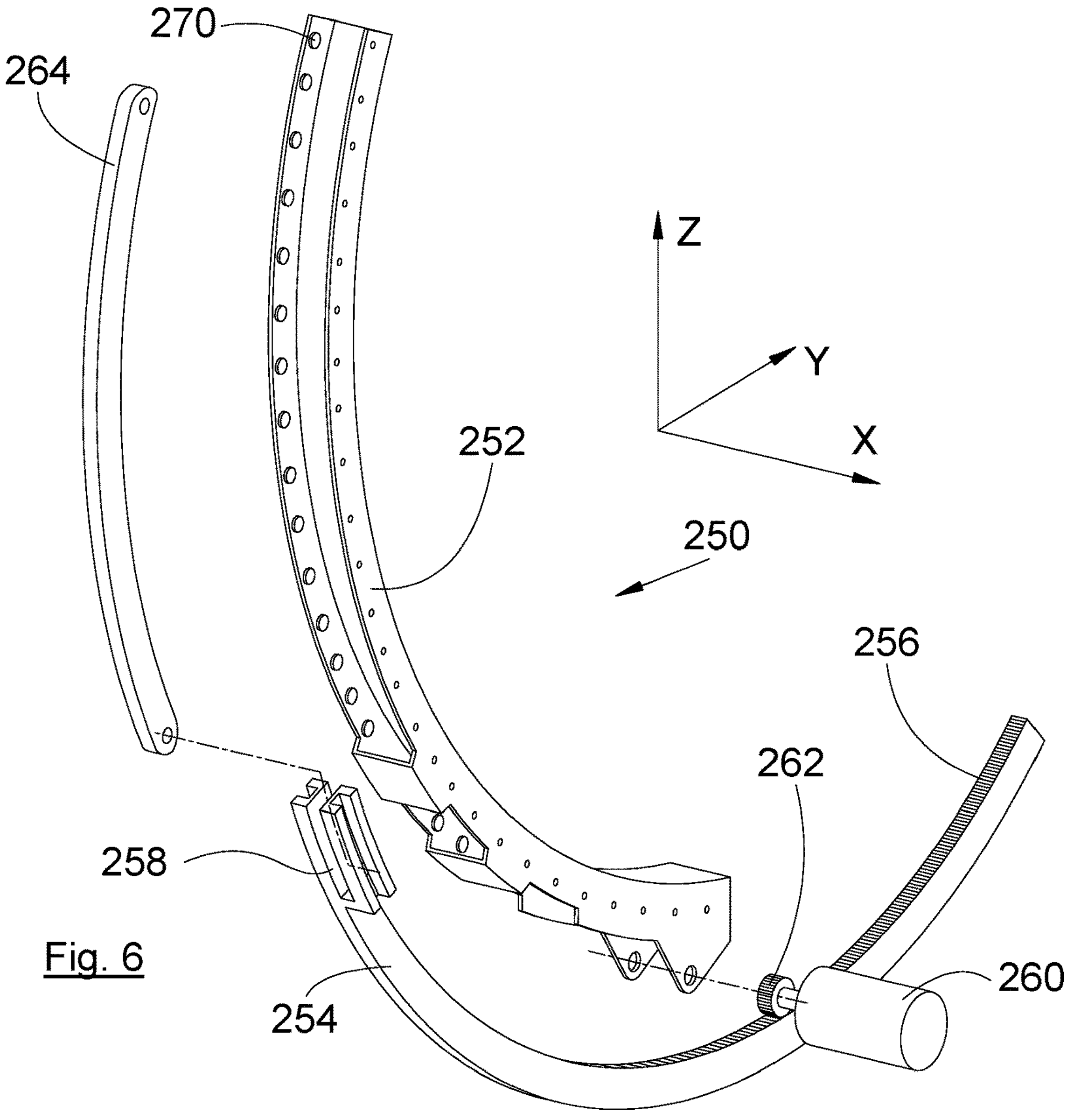
FIG. 6 is an exploded perspective view of a motorized deployment system according to the invention.

The turbofan 100 also has, for each outer cowl 112, a deployment system 250 that is motorized and moves the outer cowl 112 from the closed position to the open position and vice versa. FIG. 6 shows an exploded view of the deployment system 250 that has a guide rail 252 fastened along a part of the circumference of the fan casing 110 and in this case around the outer face of the fan casing 110, i.e., between the fan casing 110 and the outer cowl 112, and more particularly in this case between the fan casing 110 and the fixed cowl 112*a*. More particularly, in the embodiment of the invention that is presented here, the guide rail 252 is arranged so as to be inside the cascades 304, i.e., between the fan casing 110 and the cascades 304, in the advanced position, so as to save space.

The guide rail 252 is curved about the longitudinal axis X so as to follow the curvature of the fan casing 110.

There is one guide rail 252 per outer cowl 112, i.e., one on the port side and one on the starboard side. In this case, the two guide rails 252 extend from a 6 o'clock position to a generally 3 o'clock position.

In the embodiment of the invention that is presented here, the section of the guide rail 252 takes the form of a U that is open towards the outside, of which the bottom is fastened to the fan casing 110.

The deployment system 250 also has a slider 254 that is mounted so as to be able to move along the guide rail 252. As a result of the shape of the guide rail 252, the movement of the slider 254 is a rotation about the longitudinal axis X. In the embodiment of the invention that is presented here, the slider 254 moves between the U-walls of the guide rail 252.

The slider 254 has a shoe 258 of curved shape to match the shape of the guide rail 252.

The deployment system 250 has an activation system that moves the slider 254 and the shoe 258 alternately in one direction or the other along the guide rail 252.

The deployment system 250 also has an arm 264 of which one end is mounted so as to be articulated on the shoe 258 and of which the other end is mounted so as to be articulated on the outer cowl 112, and, more particularly in this case, on the fixed cowl 112*a*. Each articulation of the arm 264 in this case takes the form of a rotation about an axis parallel to the longitudinal axis X.

Thus, in the embodiment of the invention that is presented here, when the shoe 258 rises along the guide rail 252, the arm 264 is lifted and opens the outer cowl 112, and conversely, when the shoe 258 descends along the guide rail 252, the arm 264 is lowered and closes the outer cowl 112.

Such an arrangement makes it possible to save space and mass with respect to the system of the prior art.

The shoe 258 in this case takes the form of a clevis in which the end of the arm 264 is mounted.

In the embodiment of the invention that is presented in FIGS. 4 to 7, the activation system has, for each slider 254, a motor 260 that is fixed relative to the guide rail 252 and of which the drive shaft is equipped with a gear 262 and a rack 256 that is realized on the slider 254 and meshes with the gear 262. Depending on the direction of rotation of the motor and therefore of the gear 262, the rack 256 and therefore the shoe 258 will move in one direction or the other along the guide rail 252.

The rotation of each motor 260 is controlled electrically, for example by a switch.

The rack 256, in this case, has a curved shape to match the shape of the guide rail 252.

According to another embodiment that is not shown, the activation system can have a motorized reel, for each slider 254, a cable of which a first end is fastened to the slider 254 and of which a second end is wound on the motorized reel, and, for each cable, at least one return pulley disposed at a distance from the motorized reel and through which the cable passes and such that the motorized reel turns in a first direction so as to wind the cables, each slider 254 moves in a first direction along the guide rail 252 and such that the motorized reel turns in a second direction so as to unwind the cables, each slider 254 moves in a second direction along the guide rail 252 under the effect of the weight of the outer cowl 112 that is transmitted by the arm 264.

Figure 7:
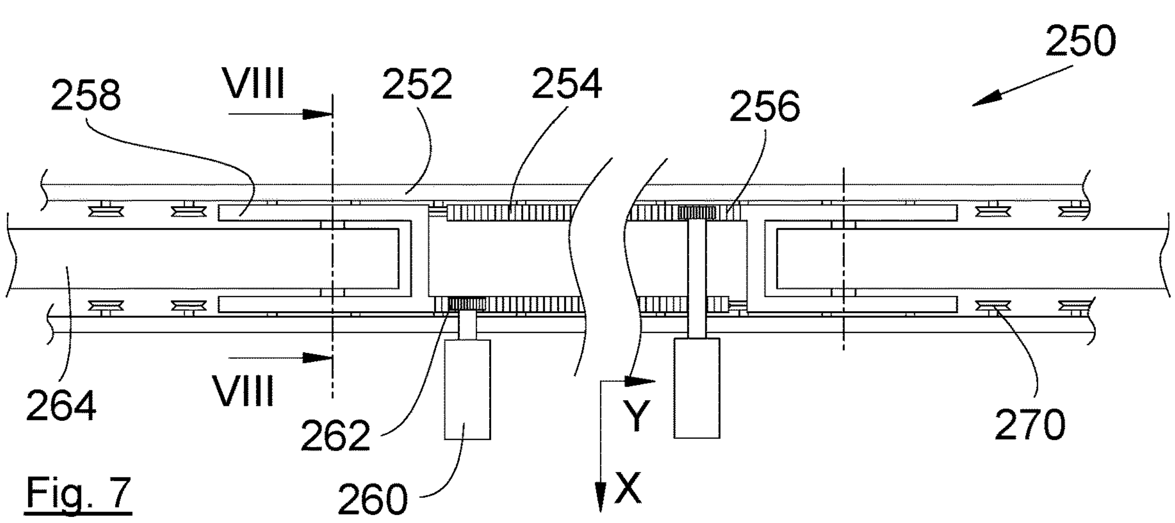
FIG. 7 is a linear representation of the deployment system in FIG. 6.
Figure 8:
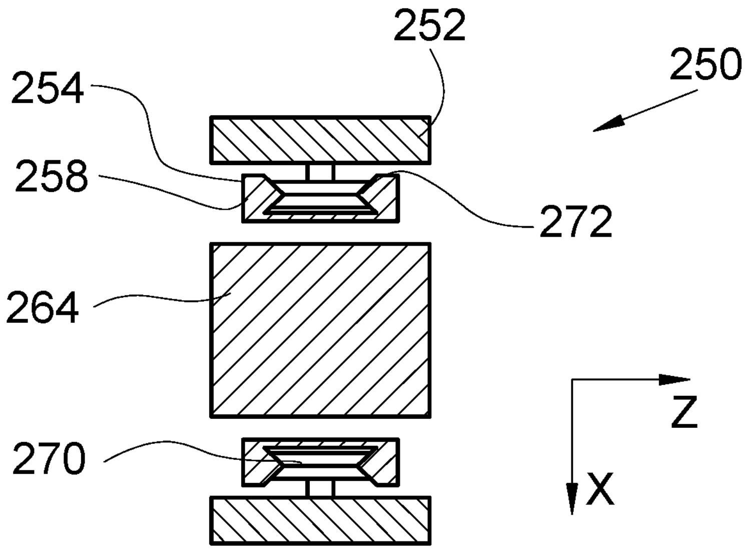
FIG. 8 is a view in section on the line VIII-VIII in FIG. 7.

FIG. 7 and FIG. 8 show one particular embodiment of the guiding of the slider 254 by the guide rail 252.

In this embodiment, the two guide rails 252 are extensions of one another in the bottom part of the turbofan 100, i.e., in this case at 6 o'clock, and, depending on its position, each slider 254 will be guided by one or both guide rails 252.

Each slider 254 takes the form of an arc inscribed in a plane perpendicular to the longitudinal axis X and the two planes are at a distance from one another.

As shown in FIG. 7, the two sliders 254 face one another parallel to the longitudinal axis X over at least a part of their movement path. In the particular embodiment of the activation system with the racks 256, each rack 256 takes the form of an arc inscribed in a plane perpendicular to the longitudinal axis X and the two planes are at a distance from one another.

In this case, the slider 254 is guided by rollers 270 and ribs 272.

The rollers 270 are distributed along each wall of the U constituting the guide rail 252 and are mounted so as to be free to rotate about axes parallel to the longitudinal axis X, i.e., there are rollers 270 disposed in front of the slider 254 and rollers 270 disposed behind the slider 254. Each roller 270 has a groove on its circumference, in this case a V-shaped groove but other shapes may be envisaged.

The ribs 272 are realized on the slider 254 and take a shape that is the inverse of that of the grooves of the rollers 270, i.e., in this case an inverted V so as to cooperate with the rollers 270. Each rib 272 is housed in each groove of the rollers 270 so as to ensure the guiding.

Each slider 254 thus has a rib 272 oriented towards the front or the rear according to the circumstances, and each shoe 258 has two ribs 272, one oriented towards the front and the other towards the rear.

Although the invention described above applies more particularly in the context of a turbofan with a cowl that is able to move in translation and mobile cascades that are fastened to the mobile cowl since the deployment system is integrated on the fan casing and beneath the cascades, the invention can equally apply when there is no such cowl that is able to move in translation or when the cascades are fixed or even in the absence of cascades.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbofan for an aircraft, said turbofan comprising:
a longitudinal axis and having a fixed structure,
a fan,
a cylindrical fan casing surrounding the fan,
at least one outer cowl disposed around the fan casing and mounted so as to be articulated on the fixed structure, and,
for each outer cowl of the at least one outer cowl, a deployment system that moves the outer cowl from a closed position to an open position and vice versa,
wherein each deployment system has:
a guide rail fastened along a part of a circumference of the fan casing,
a slider movable along the guide rail and having a shoe,
an activation system configured to move the slider and the shoe alternately in one direction or the other along the guide rail, and
an arm, one end of the arm being mounted to be articulated on the shoe and another end of the arm being mounted to be articulated on the outer cowl,
wherein the activation system has, for each slider, a motor that is fixed relative to the guide rail and of which a drive shaft is equipped with a gear and a rack that is realized on the slider and meshes with the gear.

2. The turbofan according to claim 1, wherein the guide rail is curved about the longitudinal axis.

3. The turbofan according to claim 2, wherein a section of the guide rail is formed as a U that is open towards the outside, a bottom of the U being fastened to the fan casing, and wherein the slider moves between U-walls of the guide rail.

4. The turbofan according to claim 3,
wherein rollers having a groove on their circumference are distributed along each wall of the U constituting the guide rail and are mounted so as to be free to rotate about axes parallel to the longitudinal axis, and
wherein the slider has ribs with a shape that is an inverse of that of the grooves of the rollers.

5. The turbofan according to claim 3,
wherein the turbofan has two outer cowls,
wherein the two guide rails are extensions of one another in the bottom part of the turbofan, wherein each slider is formed as an arc inscribed in a plane perpendicular to the longitudinal axis, and wherein the two planes are at a distance from one another.

6. The turbofan according to claim 1, wherein each outer cowl has a fixed cowl that is mounted in an articulated manner and a mobile cowl that is behind the fixed cowl and is mounted movable in translation on the fixed cowl between an advanced position and a retracted position.

7. The turbofan according to claim 6, wherein the turbofan has cascades secured to the mobile cowl, and wherein, in the advanced position, the cascades are housed between the fan casing and the fixed cowl and the guide rail is between the fan casing and the cascades.

8. An aircraft having at least one turbofan according to claim 1.

* * * * *